(No Model.)
P. J. HANLEY.
VEHICLE BRAKE.
No. 508,612. Patented Nov. 14, 1893.
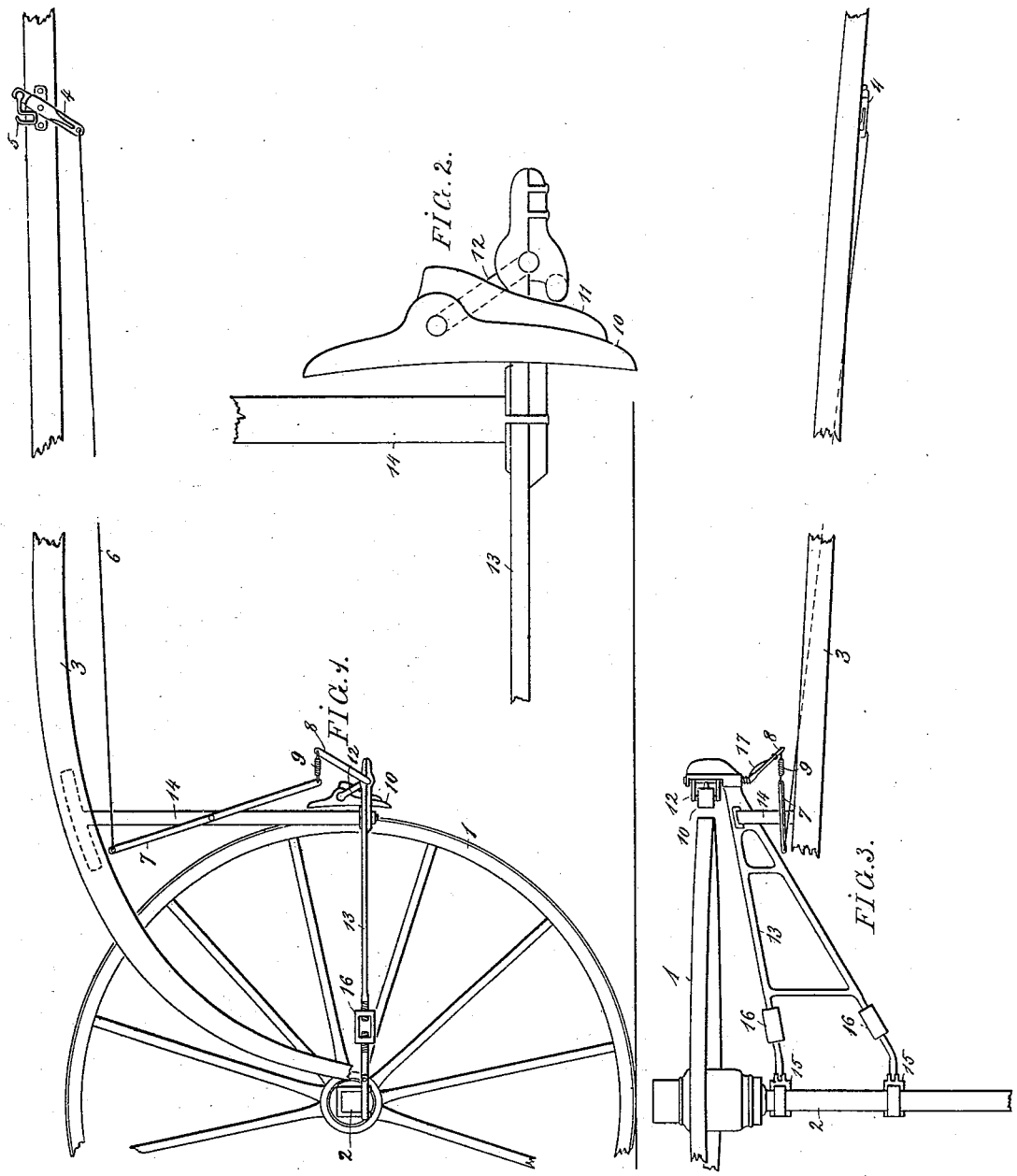

United States Patent Office.

PATRICK JOS. HANLEY, OF AMESBURY, MASSACHUSETTS.

VEHICLE-BRAKE.

SPECIFICATION forming part of Letters Patent No. 508,612, dated November 14, 1893.

Application filed February 24, 1893. Serial No. 463,604. (No model.)

*To all whom it may concern:*

Be it known that I, PATRICK JOS. HANLEY, a citizen of the United States, residing at Amesbury, in the county of Essex and State of Massachusetts, have invented a new and useful Improvement in Automatic Vehicle-Brakes, which improvement is fully set forth in the following specification and accompanying drawings, in which—

Figure 1 is an interior side elevation of the gearing of a vehicle provided with my improved automatic brake; Fig. 2, an enlarged longitudinal section of the brake and its adjuncts and Fig. 3, a plan view showing the manner of attaching the brake to a vehicle.

My invention relates to improvements in vehicle brakes and its object is to provide a simple, practical and reliable device whereby the operation of the brake is entirely controlled by the action of the horse.

The peculiar construction and application of the device will be understood by reference to the following specification and accompanying drawings in which 1 designates the wheel of a vehicle and 2 the axle having a thill 3 attached thereto in the ordinary manner. A lever 4 is suitably pivoted on the side of the thill and carries on its upper end, a hook 5 to receive the hold-back strap of the harness. The lower end of said lever is pivotally attached to a connecting rod 6, the rear end of which is similarly attached to a lever 7 having its lower end connected to an angle lever 8 by an intermediate spiral spring 9. The brake shoe 10 having a rib 11 swings on a pivot bolt which unites the arms of a yoke 12 attached to the outer end of the angle-lever 8. A triangular frame 13 in conjunction with the hanger 14 supports the brake apparatus. The rear ends of the frame-arms are pivoted in forked extensions of the clips 15 which are attached to the axle. The frame is made longitudinally adjustable by swivel-joints 16 and the horizontal position of the brake-shoe in its relation to the wheel may be altered by the same means. A coiled spring 17 retracts the brake when the backing force ceases.

The peculiar operation of the device is easily explained. It will be observed that when the hold-back strap bears on the lever 4 and its connections, the brake-shoe responds, and being suspended on a pivot, its entire surface will necessarily bear uniformly on the wheel and while the latter revolves in a forward direction, the downward motion in front will be communicated to the brake shoe which then operates as a wedge. It is obvious that the friction will thus be greatly augmented, and that a comparatively moderate tension exerted by the hold-back strap will insure all the force that may be required.

It will be furthermore understood that if the vehicle be brought to a stand-still and the backing force resumed, the motion of the wheel will be reversed. The shoe will thus be drawn upwardly and being at the same time partly supported by the retractive spring 17, the friction will be sufficiently reduced to permit the vehicle to be backed. The invention is equally adaptable to pole vehicles by slight modifications in the form of attachment.

What I claim as new is—

In an automatic brake, the combination with the thill or pole of a vehicle, of the herein described series of levers and their connections; the rotatable angle-lever actuated by said series of levers and provided with a retracting spring and a vertically swinging yoke; the brake-shoe pivoted in the yoke and the adjustable supporting frame pivotally attached to the axle of the vehicle, all arranged substantially as and for the purpose herein set forth.

In testimony that I claim the foregoing I have hereunto set my hand, this 17th day of February, 1893, in the presence of witnesses.

PATRICK JOS. HANLEY.

Witnesses:
  J. W. SVANBERG,
  N. D. MARSTON.